United States Patent
Bae et al.

(10) Patent No.: US 12,539,554 B2
(45) Date of Patent: Feb. 3, 2026

(54) FLASH BUTT WELDING MEMBER AND FLASH BUTT WELDING METHOD FOR PROVIDING WHEEL RIM WELD PART WITH EXCELLENT FORMABILITY

(71) Applicant: POSCO, Pohang-si (KR)

(72) Inventors: Gyu-Yeol Bae, Incheon (KR); Ho-Soo Kim, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 545 days.

(21) Appl. No.: 17/285,759

(22) PCT Filed: Aug. 25, 2020

(86) PCT No.: PCT/KR2020/011280
§ 371 (c)(1),
(2) Date: Apr. 15, 2021

(87) PCT Pub. No.: WO2021/045426
PCT Pub. Date: Mar. 11, 2021

(65) Prior Publication Data
US 2021/0379688 A1    Dec. 9, 2021

(30) Foreign Application Priority Data

Sep. 6, 2019  (KR) .......................... 10-2019-0110708

(51) Int. Cl.
*B23K 11/04* (2006.01)
*B23K 11/00* (2006.01)
*B23K 103/04* (2006.01)

(52) U.S. Cl.
CPC ............ *B23K 11/04* (2013.01); *B23K 11/002* (2013.01); *B23K 2103/04* (2018.08); *B60B 2310/302* (2013.01)

(58) Field of Classification Search
CPC .. B23K 11/002; B23K 11/04; B23K 2103/04; B23K 9/164; B23K 9/095; B23K 9/23; B23K 9/235; B60B 2310/302
See application file for complete search history.

(56) References Cited

U.S. PATENT DOCUMENTS 4,388,122 A     6/1983  Sudo et al.
8,974,610 B2 *  3/2015  Fujishiro ............... C22C 38/002
                                                   148/590

(Continued)

FOREIGN PATENT DOCUMENTS

CN     101372062 A      2/2009
CN     102107320 A  *   6/2011

(Continued)

OTHER PUBLICATIONS

Machine translation of KR-100651782: Jeong, Flash butt welding method of high strength steel for automobile and welding joint of the same, 2005 (Year: 2005).*

(Continued)

*Primary Examiner* — Vy T Nguyen
*Assistant Examiner* — Abigail H Rhue
(74) *Attorney, Agent, or Firm* — Morgan Lewis & Bockius LLP

(57) ABSTRACT

Provided are a flash butt welding member and a flash butt welding method for providing a wheel rim weld part with excellent formability. The flash butt welding member of the present invention satisfies that a weld part has a hardness of 220-270 Hv, and d<0.25T, when d is the closest distance between fine-grained heat affected zones (HAZ) formed at the left and right of the weld part while facing each other and T is the thickness of a weld base metal, and satisfies L/T>2, when the total length of an upset part constituting the weld part is L.

5 Claims, 5 Drawing Sheets

(56) References Cited

U.S. PATENT DOCUMENTS

| | | | |
|---|---|---|---|
| 9,617,690 B2* | 4/2017 | Saita | B23K 11/04 |
| 2012/0234806 A1 | 9/2012 | Saita et al. | |
| 2015/0283643 A1 | 10/2015 | Dahlman et al. | |
| 2017/0080515 A1 | 3/2017 | Furusako et al. | |

FOREIGN PATENT DOCUMENTS

| | | | | | |
|---|---|---|---|---|---|
| CN | 102665994 | B | | 4/2015 | |
| CN | 105522262 | A | * | 4/2016 | B23K 9/095 |
| CN | 109365971 | A | * | 2/2019 | B23K 11/04 |
| CN | 109676227 | A | | 4/2019 | |
| FR | 2488285 | A | | 2/1982 | |
| JP | 2007-098462 | A | | 4/2007 | |
| JP | 4902021 | B2 | | 1/2012 | |
| JP | 2015-510452 | A | | 4/2015 | |
| JP | 2003-170274 | A | | 6/2017 | |
| JP | 2017-531563 | A | | 10/2017 | |
| KR | 100651782 | B1 | * | 12/2005 | B23K 31/027 |
| KR | 10-0711459 | B1 | | 4/2007 | |
| KR | 10-1281294 | B1 | | 7/2013 | |
| KR | 10-2016-0140813 | A | | 12/2016 | |
| KR | 10-2017-0123551 | A | | 11/2017 | |
| KR | 10-2019-0076756 | A | | 7/2019 | |
| WO | 2016/025294 | A1 | | 2/2016 | |

OTHER PUBLICATIONS

Machine translation of CN-102107320: Cui, Pulsed switch-on pre-heating flash butt welding process for steel rims of heavy trucks, 2011 (Year: 2011).*
Machine translation of CN-109365971: Han, A kind of flash welding manufacturing process of CLAM steel, 2019 (Year: 2019).*
Machine translation of CN-105522262: Deng, Yield Strength Of 1100MPa MPa Low-alloy Ultrahigh-strength Steel Welding Method, 2016 (Year: 2016).*
Chinese Office Action dated Mar. 7, 2022 issued in Chinese Patent Application No. 202080004714.3.
Japanese Office Action dated Apr. 5, 2022 issued in Japanese Patent Application No. 2021-509158.
Extended European Search Report dated Nov. 11, 2021 issued in European Patent Application No. 20861065.9.
V.S. Kachinskiy, et al, "Magnetically Impelled Arc Butt Welding of Hollow and Solid Parts," Welding in the World, Springer, DE, vol. 46, No. 7/08, Jul. 1, 2002, pp. 49-56.
International Search Report dated Nov. 3, 2020 issued in International Patent Application No. PCT/KR2020/011280 (with English translation).

* cited by examiner

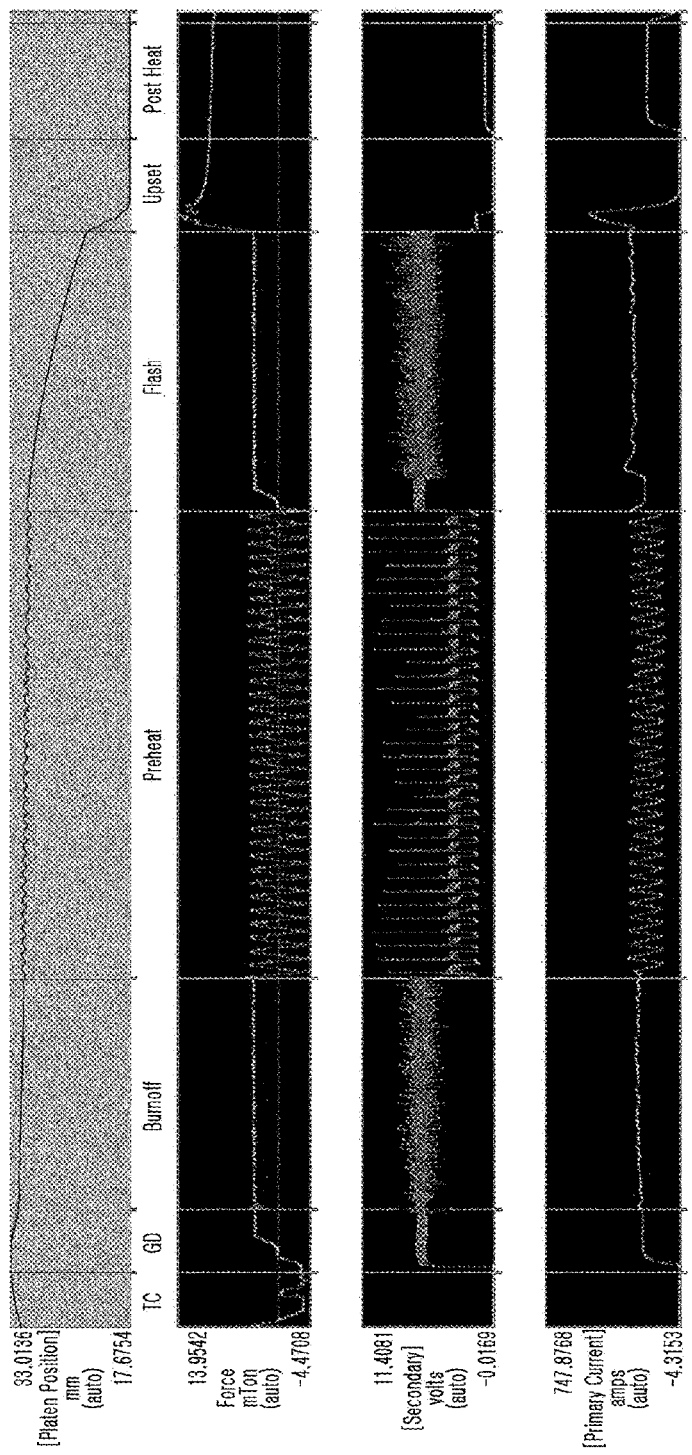
[FIG. 1]

[FIG. 2]
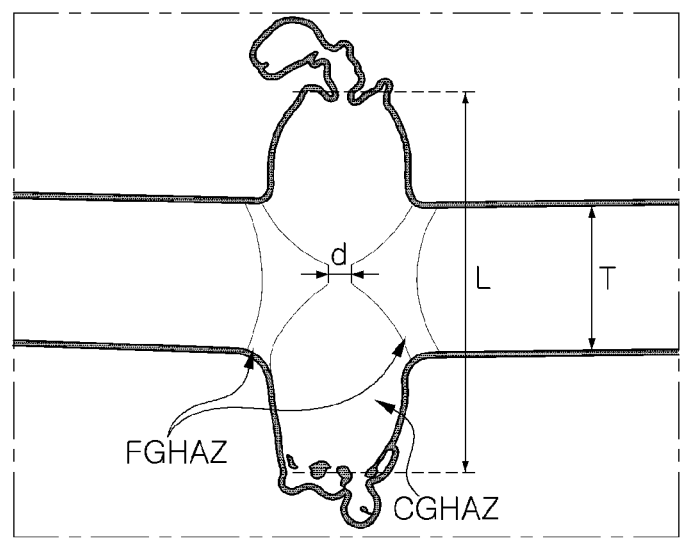

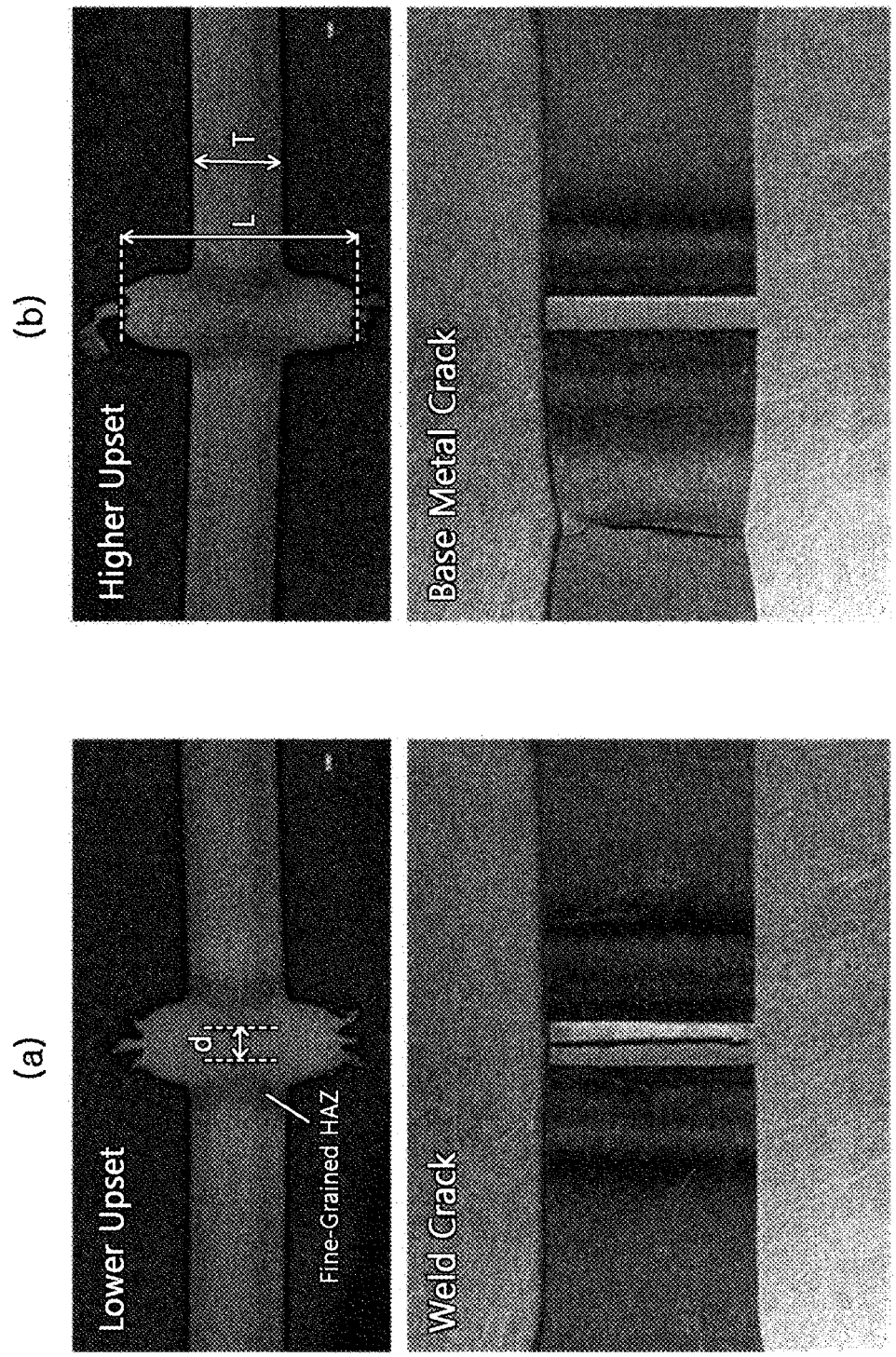
[FIG. 3]

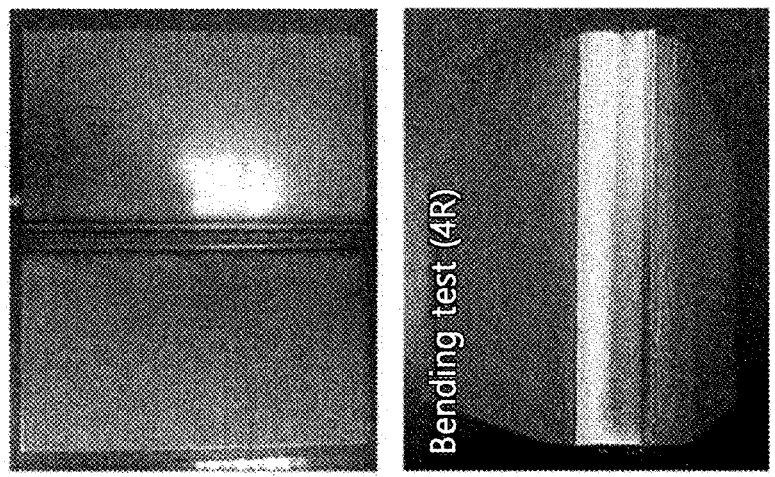
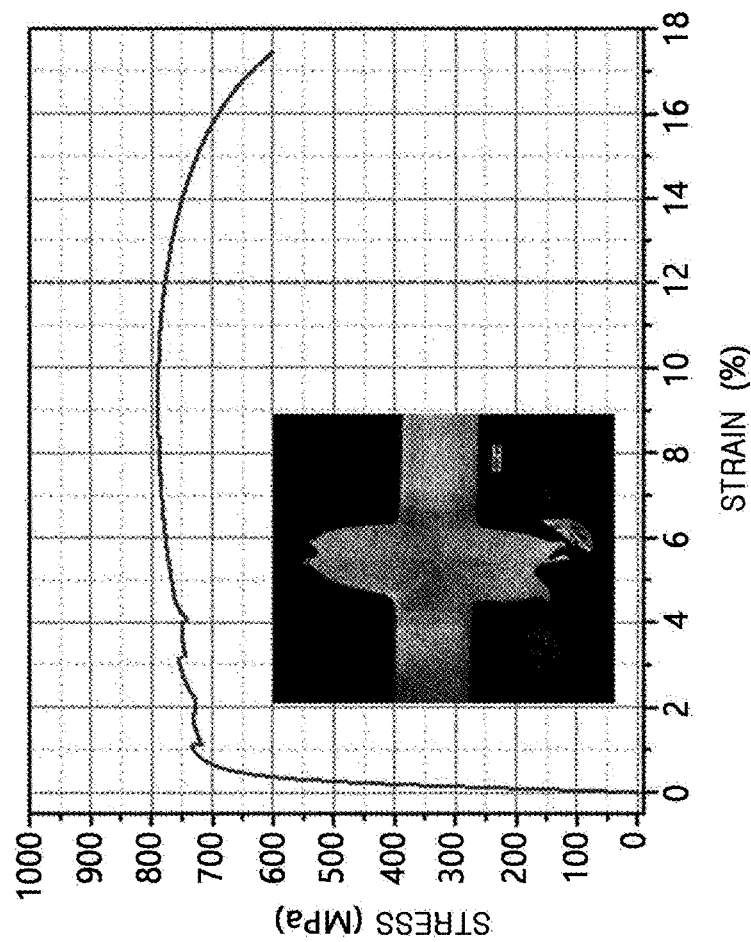
[FIG. 4]

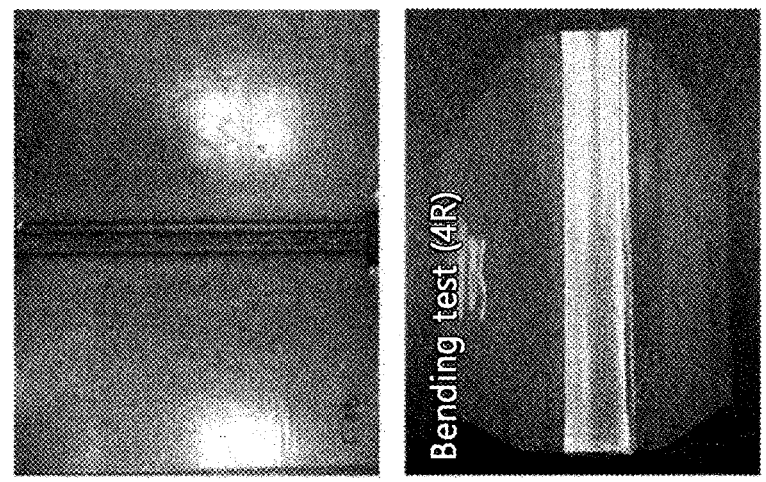
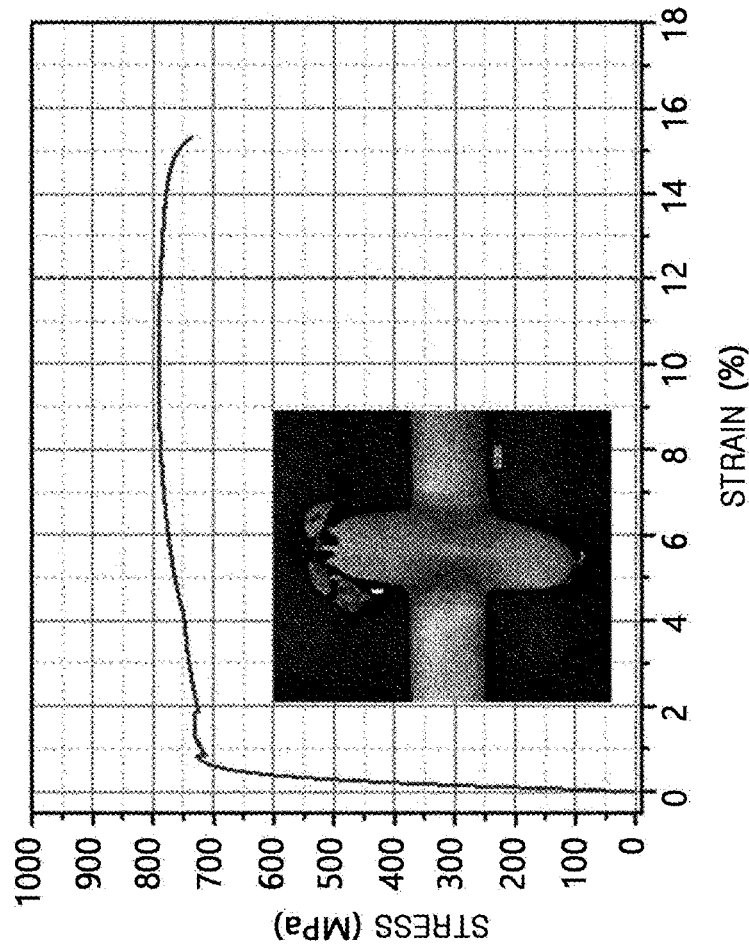
[FIG. 5]

FLASH BUTT WELDING MEMBER AND FLASH BUTT WELDING METHOD FOR PROVIDING WHEEL RIM WELD PART WITH EXCELLENT FORMABILITY

CROSS-REFERENCE OF RELATED APPLICATIONS

This application is the U.S. National Phase under 35 U.S.C. § 371 of International Patent Application No. PCT/KR2020/011280, filed on Aug. 25, 2020, which in turn claims the benefit of Korean Application No. 10-2019-0110708, filed on Sep. 6, 2019, the entire disclosures of which applications are incorporated by reference herein.

TECHNICAL FIELD

The present disclosure relates to manufacturing of a flash butt welding member capable of improving strength and formability of a weld portion of a high strength hot rolled steel having a tensile strength of 780 MPa or more and a thickness of 6 mm or less applied to a light steel automobile wheel or the like, and more particularly, to a flash butt welding member and welding method capable of controlling hardness of a weld portion to 220 Hv or more 270 Hv or less by adopting pre-/upset-/post-heat optimization patterns at the time of flash butt welding and further capable of ensuring formability through improvement of toughness of the weld portion at the time of manufacturing parts by supplementing a region of a coarse-grained heat affected zone, which degrades toughness of the weld portion, with a fine-grained heat affected zone.

BACKGROUND ART

In an automotive field, research into a technology for weight reduction of vehicle bodies and parts has emerged as a major issue due to a policy for fuel economy regulation based on environmental protection such as global warming or the like. With this trend, it is required to apply high-strength steel for weight reduction to chassis parts, which are important for vehicle driving performance. In order to achieve weight reduction of parts, it is essential to increase strength of materials, and in particular, in the case of forming after welding to manufacture parts, securing formability of the weld portion may be considered to be an important factor.

Flash butt welding, mainly used for assembling a wheel rim of a vehicle, is a process of joining through melting and scattering of a joint target surface and upsetting a fusion zone by a flash arc, and it is important to select optimal conditions for securing formability of a weld portion. In particular, in the case of high-strength steel, due to a relatively high carbon equivalent, development of a brittle structure based on hardening of a joint is a factor of deterioration of the formability, so it is necessary to develop process conditions for controlling phase transformation of the joint. A high defect ratio of formation cracks of the weld portion in the actual wheel rim manufacturing line makes it difficult to apply mass-production, so it is important to derive a solution therefor.

An example of the related art to solve the problem may include the invention described in Korean Patent Registration No. 10-1281294. According to the related art, an increase in the amount of upset in a joining step is proposed to effectively discharge oxide inclusions formed at high temperatures during flash butt welding. In addition, Korean Patent Registration No. 10-0711459 presents an oil application device for suppressing formation of oxide inclusions during flash butt welding of high-tensile steel.

However, the related art does not present a method for controlling a structure of the high-strength steel flash butt weld portion as mentioned above, having a limitation in that it does not present a fundamental solution for improving the formability of the weld portion when manufacturing parts.

RELATED ART DOCUMENT

Patent Document (Patent document 1) Korean Patent Registration No. 10-1281294

(Patent document 2) Korean Patent Registration No. 10-0711459

DISCLOSURE

Technical Problem

An aspect of the present disclosure may provide a flash butt welding member having excellent formability for wheel rim weld portion and welding method capable of controlling hardness of a weld portion to 220 Hv or more 270 Hv or less by adopting pre-/upset-/post-heat optimization patterns at the time of flash butt welding and capable of ensuring toughness and formability of the weld portion by supplementing a region of a coarse-grained heat affected zone, which degrades toughness of the weld portion, with a fine-grained heat affected zone, to prevent a degradation of toughness of the weld portion according to the development of a martensite phase with a Vickers hardness of 300 Hv or more, as a method for controlling a structure of a phase transformation at the time of welding a high strength hot-rolled steel having tensile strength of 780 MPa or more and a thickness of 6 mm or less applied to an light steel automobile wheel or the like.

Technical objects to be achieved by the present invention are not limited to the aforementioned technical objects, and other technical objects not described above may be evidently understood by a person having ordinary skill in the art to which the present invention pertains from the following description.

Technical Solution

According to an aspect of the present disclosure, a welding member having excellent formability for a wheel rim weld portion, including a weld portion obtained by flash butt welding two steel plates using an electrode, wherein hardness of the weld portion is 220 to 270 Hv, the weld portion satisfies d<0.25 T in which d is a shortest distance between fine-grained heat affected zones (HAZs) formed on left and right of the weld portion in a facing manner and T is a thickness of a welding target material, and the weld portion satisfies L/T>2 in which L is an overall length of an upset part forming the weld portion.

The weld portion may satisfy d<0.13T.

The weld portion may satisfy 3<L/T<4.

An average grain diameter of a coarse-grained HAZ portion forming the weld portion may be 100 μm or less, and an average grain diameter of the fine-grained HAZ portion may be 10 μm or less.

According to another aspect of the present disclosure, in a flash butt welding method of flash butt welding a weld target surface of two steel plates using an electrode and subsequently upset heating, the flash butt welding method may include: pre-heating the weld target surface of the steel plate before the flash butt welding, cooling the upset heated weld portion, and subsequently post-heating the weld portion.

The weld portion obtained by the post-heating may have hardness of 220 to 270 Hv, satisfy d<0.25 T in which d may be a shortest distance between fine-grained heat affected zones (HAZs) formed on left and right of the weld portion in a facing manner and T is a thickness of a welding target material, and satisfy L/T>2 in which L is an overall length of an upset part forming the weld portion.

Advantageous Effects

According to exemplary embodiments of the present disclosure, toughness of the weld portion can be improved through optimization of microstructures of the flash butt weld portion of the high strength hot-rolled steel having a tensile strength of 780 MPa or more and a thickness of 6 mm or less, and thus, strength and formability of the weld portion may be effectively improved in manufacturing a light steel wheel rim for automobile. Therefore, this solution has the effect of creating new demand for steel and expanding sales, when applied to light steel wheel rims for commercial vehicles.

DESCRIPTION OF DRAWINGS

FIG. 1 is a diagram schematically illustrating flash butt welding patterns (pre-heat, upset-heat, and post-heat steps) according to an exemplary embodiment in the present disclosure.

FIG. 2 is a cross-sectional view of a weld portion manufactured according to an exemplary embodiment in the present disclosure.

FIGS. 3(a) and 3(b) are photographs illustrating a cross-sectional structure of a flash butt weld, in which FIG. 3(a) is Comparative Example 5 and FIG. 3(b) is Inventive Example 1.

FIG. 4 is a photograph illustrating tension of a flash butt weld portion of a complex phase steel having a tensile strength of 780 MPa grade and a three-point bending (4R) result for Inventive Example 2 in the exemplary embodiment in the present disclosure.

FIG. 5 is a photograph illustrating tension of a flash butt weld portion of a dual phase steel having a tensile strength of 780 MPa grade and a three-point bending (4R) result for Inventive Example 3 in the exemplary embodiment in the present disclosure.

BEST MODE

Hereinafter, the present disclosure will be described.

The present disclosure provides a technology capable of controlling hardness of a weld portion to 220 Hv or more 270 Hv or less by adopting pre-/upset-/post-heat patterns at the time of flash butt welding and capable of improving toughness of the weld portion by supplementing a region of a coarse-grained heat affected zone, which degrades toughness of the weld portion, with a fine-grained heat affected zone.

Therefore, the present disclosure provides a welding member including a weld portion obtained by flash butt welding two steel plates using an electrode, wherein hardness of the weld portion is 220 to 270 Hv, the weld portion satisfies d<0.25 T in which d is a shortest distance between fine-grained heat affected zones (HAZs) formed on left and right of the weld portion in a facing manner and T is a thickness of a welding target material, and the weld portion satisfies L/T>2 in which L is an overall length of an upset part forming the weld portion.

FIG. 1 is a diagram schematically illustrating flash butt welding patterns (pre-heat, upset-heat, and post-heat steps) according to an exemplary embodiment in the present disclosure.

As shown in FIG. 1, a flash butt welding process of the present disclosure includes 1) burning off (melting and scattering a joint target surface of a material), 2) preheating (preheat the joint target surface evenly), 3) flashing (melting and scattering the joint target surface with high arc heat), 4) upsetting (discharging and joining a fusion zone by pressing the joint target surface with a predetermined force [here, rapid cooling of a joint part is relieved by introducing upset heat]) and 5) post-heating (post-heat treatment for tempering a brittle structure of low temperature transformation after phase transformation of the joint part).

That is, the present disclosure provides a flash butt welding method having excellent formability for a wheel rim weld portion, in the flash butt welding method of welding a weld target surface of two steel plates using an electrode and upset heating, wherein the weld target surface of the steel plate is pre-heated before the flash butt welding, the upset-heated weld portion is cooled, and thereafter, the weld portion is post-heated.

As such, the weld portion obtained using the welding process may be further improved in toughness and formability. That is, the weld portion having excellent toughness and formability may be obtained by sequentially using pre-heat (pre-heating), flash, upset-heat, post-heat (post-heating), etc. In this case, the present disclosure is not limited to the specific process conditions in the process.

However, when a short-circuit current is 100%, it is preferable to apply a current in the range of 30 to 40% for preheating, 60 to 70% for flash, 30 to 40% for upset heat, and 10 to 15% for post-heat.

In addition, preferably, a preheating time is managed in the range of 1.5 to 4.0 seconds, the upset heating time is managed in the range of 0.17 to 0.3 seconds, and the post heating time is managed in the range of 0.1 to 0.3 seconds.

In the case of upset heating, an upset force is in the range of 7.0 to 11.0 tons and an upset length is in the range of 7.0 to 7.5 mm.

When the welding conditions as described above are applied, the appropriate values of d and L/T of the weld portion may be satisfied, and at the same time, it is possible to secure excellent formability through improvement of toughness of the weld portion by controlling hardness of a final continuous cooling phase transformation structure to 200 Hv or more and 270 Hv or less through appropriate control of the heating and cooling rate of the weld portion.

In the present disclosure, the region of the coarse-grained heat affected zone (CGHAZ) generated through the high-temperature heat history is minimized by optimizing the discharge of the fusion part with an appropriate upset through optimization of the flash welding process, and at the same time, an occurrence of cracks may be prevented at the time of machining parts by minimizing a distance between regions of the fine-grained heat affected zones (FGHAZs) formed on both sides of the joint target surface. Meanwhile, in the present disclosure, the CGHAZ refers to a coarse-grained heat affected zone with high brittleness formed by heating to 1200° C. or higher, and the FGHAZ refers to a the fine-grained heat affected zone formed by heating to 850 to 1000° C., which is refined by recrystallization and has good mechanical properties such as toughness.

Here, in the present disclosure, when the shortest distance between the fine-grained HAZ portions formed on the left and right of the welding part in a facing manner is d and a thickness of a welding target material is T, d<0.25T is satisfied. If the value d exceeds 0.25T, toughness and formability of the weld portion cannot be guaranteed. FIG.

2 is a cross-sectional view of a weld portion manufactured according to an exemplary embodiment in the present disclosure.

More preferably, the weld portion satisfies d<0.131.

Further, in the present disclosure, when a total length of the upset part constituting the weld portion is L, L/T>2 is satisfied. If the L/T value is less than 2, the fusion part and oxide formed at a joint interface may not be sufficiently discharged, which in turn cause a decrease in bonding strength and, in addition, d<0.251 cannot be satisfied so it is not possible to ensure excellent toughness and formability of the weld portion.

More preferably, the weld portion satisfies 3<L/T<4.

In addition, in the present disclosure, pre-heat, upset-heat, and post-heat are appropriately adopted to control hardness to 220 Hv or more and 270 Hz or less after phase transformation of the weld portion, thereby preventing forming cracks due to brittleness.

Further, in the present disclosure, an average grain diameter of the coarse-grained HAZ portion forming the weld portion is preferably 100 μm or less, and an average grain diameter of the fine-grained HAZ portion is preferably 10 μm or less. An average grain diameter of the base metal before welding is about 4 μm, so that it is a grain diameter of the weld portion required for ensuring excellent formability of the weld portion obtained through the technical idea of the present disclosure. If the amount of heat for flash butt welding is excessive, a grain diameter of the HAZ portion according to growth of grains increases on the whole, which causes a decrease in mechanical properties of the weld portion.

MODE FOR INVENTION

Hereinafter, the present disclosure will be described in detail through examples.

EXAMPLE

A complex phase steel, welding target material having a thickness of 4.2 mmt and tensile strength of 780 MPa grade was prepared. Thereafter, the hardness of a weld portion constituting each welding member obtained after performing flash butt welding of the same above was measured according to the welding conditions shown in Table 1 below, and results are shown in Table 1 below.

In addition, with respect to the weld portion constituting each of the obtained welding members, the shortest distance d between the fine-grained HAZ portions formed on the left and right of the weld portion in a facing manner and L (overall length of upset part forming the weld portion)/T (thickness of weld base metal) were measured and results thereof are shown in Table 2. In addition, a tensile test was conducted on each welding member having the weld portion obtained as described above to evaluate a position where fracture occurred, and the presence or absence of bending cracks were evaluated by performing 3-point bending test (4R) as shown in Table 2.

TABLE 2

| | Classification | d | L/T | Position of tensile fracture | Bending crack |
|---|---|---|---|---|---|
| 1 | Inventive example | 0.12 | 2.8 | Base metal | X |
| 2 | Inventive example | 0.23 | 3.6 | Base metal | X |
| 3 | Inventive example | 0.24 | 3.4 | Base metal | X |
| 4 | Comparative example | 0.31 | 1.9 | Weld portion | O |
| 5 | Comparative example | 0.46 | 2.0 | Weld portion | O |
| 6 | Comparative example | 0.95 | 1.8 | Weld portion | O |
| 7 | Comparative example | 0.92 | 1.7 | Weld portion | O |

As shown in Table 1 and Table 2, it can be seen that, in Inventive Examples 1 to 3 in which all of the obtained values d of the weld portion and the values L/T satisfy the predetermined range from flash butt welding by sequentially using pre-heat, upset-heat, and post-heat processes, fracture occurs in the base metal in the tensile test and bending cracks do not occur in the bending test.

On the contrary, it can be seen that, in the case of Comparative Examples 4 to 7 in which preheating, upset heat, upset force and upset length are not appropriate or post-heat treatment process, etc. are not used, all of the obtained values d of the weld portion and the values L/T are outside the range of the present disclosure and fracture occurs in the weld portion in the tensile test and bending cracks occur in the bending test. That is, as in Comparative Example 5, it can be seen that, although the pre-heat process

TABLE 1

| | Classification | Pre-heat (%) | Pre-heat time (sec) | Flash (%) | Upset heat (%) | Upset heat time (sec) | Upset force (Ton) | Upset length (mm) | Post-heat (%) | Post-heat time (sec) | Hardness of weld portion (Hv) |
|---|---|---|---|---|---|---|---|---|---|---|---|
| 1 | Inventive example | 30 | 4.0 | 60 | 30 | 0.25 | 7.0 | 7.2 | 15 | 0.3 | 220~245 |
| 2 | Inventive example | 30 | 3.0 | 70 | 40 | 0.17 | 11.0 | 7.0 | 10 | 0.1 | 220~265 |
| 3 | Inventive example | 40 | 1.5 | 70 | 35 | 0.30 | 11.0 | 7.5 | 12 | 0.2 | 220~255 |
| 4 | Comparative example | 0 | 0 | 60 | 30 | 0.33 | 10.0 | 6.0 | 0 | 0.0 | 275~300 |
| 5 | Comparative example | 25 | 2.0 | 55 | 10 | 0.25 | 7.0 | 1.0 | 0 | 0.0 | 277~305 |
| 6 | Comparative example | 0 | 0 | 60 | 30 | 0.17 | 10.0 | 3.0 | 0 | 0.0 | 285~310 |
| 7 | Comparative example | 25 | 1.6 | 55 | 10 | 0.08 | 7.0 | 6.0 | 0 | 0.0 | 280~307 |

* Current % in Table 1 is a ratio of short-circuit current is applied, if the upset length is 1.0 mm outside the appropriate value, the values d and L/T are outside the appropriate range proposed in the present disclosure and, in addition, since a post-heat process is absent, a maximum hardness value of the weld portion reaches up to 300 Hv to increase brittleness.

FIGS. 3(a) and 3(b) are photographs illustrating a cross-sectional structure of a flash butt weld portion, in which FIG. 3(a) is Comparative Example 5, and FIG. 3(b) is Inventive Example 1. As shown in FIG. 3, it can be seen that, when the value of d of the weld portion (distance between fine-grained HAZs) is within 13% of the thickness T of the base metal and the L/T exceeds 2, the occurrence of tensile fracture of the weld portion is prevented and bending cracks do not occur.

Meanwhile, FIG. 4 is a photograph illustrating tensile result of a flash butt weld portion of a complex phase steel having a tensile strength of 780 MPa grade and a three-point bending (4R) result for Inventive Example 2 in the exemplary embodiment in the present disclosure, and FIG. 5 is a photograph illustrating tensile result of a flash butt weld portion of a complex phase steel having a tensile strength of 780 MPa grade and a three-point bending (4R) result for Inventive Example 3 in the exemplary embodiment in the present disclosure. It can be seen that, values d are less than 25% of the values T in both cases of FIGS. 4 and 5, and thus, tensile characteristics and bending characteristics are excellent.

Exemplary embodiments of the present disclosure have been described in the detailed description of the present invention. However, various modifications may be made by a person skilled in the art to which the present disclosure pertains without departing from the scope of the present disclosure. Technical concepts of the present invention should not be determined to be limited to the described exemplary embodiments of the present disclosure but be determined by claims and equivalents thereof, as well as claims.

The invention claimed is:

1. A welding member having formability for a wheel rim weld portion, the welding member comprising:
   a weld portion obtained by flash butt welding two steel plates using an electrode; and
   a first fine-grained heat affected zone (HAZ) and a second fine-grained HAZ on the left and right, respectively, of the weld portion in a facing manner,
   wherein:
   a hardness of the weld portion is 220 to 270 Hv, the weld portion satisfies d<0.25 Tin which d is a shortest distance between the first fine-grained HAZ and the second fine-grained HAZ and T is a thickness of a welding target material,
   the weld portion satisfies 2<L/T in which L is an overall length of an upset part forming the weld portion,
   and an average grain diameter of the fine-grained HAZ is 10 μm or less.

2. The welding member of claim 1, wherein the weld portion satisfies d<0.13T.

3. The welding member of claim 1, wherein an average grain diameter of a coarse-grained HAZ portion forming the weld portion is 100 μm or less.

4. A flash butt welding method comprising:
   pre-heating a weld target surface of two steel plates including applying a first current that is 30 to 40% of a short-circuit current,
   flash butt welding the pre-heated weld target surface of the two steel plates via an electrode and subsequently upset heating to form an upset heated weld portion,
   cooling the upset heated weld portion to form a cooled weld portion, and
   and post-heating the cooled weld portion to form a weld portion,
   wherein the weld portion obtained has hardness of 220 to 270 Hv, satisfies d<0.25 T in which d is a shortest distance between fine-grained heat affected zones (HAZs) formed on the left and right of the weld portion in a facing manner and T is a thickness of a welding target material, and satisfies 2<L/T in which L is an overall length of an upset part forming the weld portion.

5. The method of claim 4, wherein the pre-heating of the weld target surface of the two steel plates further includes applying the first current for 1.5 to 4.0 seconds, and
   wherein the post-heating of the cooled weld portion includes applying a second current for 0.1 to 0.3 seconds, where the second current is 10 to 15% of a short-circuit current.

* * * * *